US011788397B2

(12) United States Patent
AlKhaldi et al.

(10) Patent No.: US 11,788,397 B2
(45) Date of Patent: Oct. 17, 2023

(54) RETARDED ACID SYSTEM BASED ON SULFONYL CHLORIDE AND METHODS THEREOF

(71) Applicant: SAUDI ARABIAN OIL COMPANY, Dhahran (SA)

(72) Inventors: Mohammed AlKhaldi, Dhahran (SA); Abdullah Almoajil, Dhahran (SA); Abdulaziz AlGhamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 74 days.

(21) Appl. No.: 17/314,761

(22) Filed: May 7, 2021

(65) Prior Publication Data

US 2022/0356795 A1 Nov. 10, 2022

(51) Int. Cl.
*E21B 43/27* (2006.01)
*C09K 8/72* (2006.01)

(52) U.S. Cl.
CPC .............. *E21B 43/27* (2020.05); *C09K 8/72* (2013.01)

(58) Field of Classification Search
None
See application file for complete search history.

(56) References Cited

U.S. PATENT DOCUMENTS

| 2,794,003 | A | * | 5/1957 | Cier | C10L 7/02 |
| | | | | | 516/112 |
| 2,910,488 | A | * | 10/1959 | Novello | E21B 21/12 |
| | | | | | 544/94 |
| 3,537,522 | A | * | 11/1970 | Harnsberger | C09K 8/565 |
| | | | | | 166/295 |
| 3,644,266 | A | * | 2/1972 | Harnsberger | C09K 8/565 |
| | | | | | 524/852 |
| 3,779,916 | A | | 12/1973 | Crowe | |
| 3,943,084 | A | | 3/1976 | Hess | |
| 4,073,343 | A | * | 2/1978 | Harnsberger | C09K 8/565 |
| | | | | | 166/295 |
| 4,148,360 | A | | 4/1979 | Watanabe | |
| 10,421,898 | B2 | | 9/2019 | Cairns et al. | |
| 2008/0078549 | A1 | | 4/2008 | Moorehead et al. | |
| 2008/0214414 | A1 | * | 9/2008 | Carroll | C09K 8/72 |
| | | | | | 507/247 |
| 2010/0270021 | A1 | * | 10/2010 | Baran, Jr. | C09K 8/80 |
| | | | | | 166/305.1 |
| 2016/0294008 | A1 | * | 10/2016 | Yoshida | H01M 10/0567 |
| 2019/0382650 | A1 | | 12/2019 | Cairns et al. | |

FOREIGN PATENT DOCUMENTS

| CN | 111057534 A | 4/2020 |
| WO | 2007/018922 A2 | 2/2007 |
| WO | 2020076993 A1 | 4/2020 |

OTHER PUBLICATIONS

Sayed, Mohammed et al., "A Low-Viscosity Retarded Acid System for Stimulation of High-Temperature Deep Wells", Paper No. OTC-28838-MS, presented at the Offshore Technology Conference, Houston, Texas, USA, Apr. 2018 (20 pages).

Abdrazakov, Dmitriy et al., "New Single-Phase Retarded Acid System Boosts Production after Acid Fracturing in Kazakhstan", Paper No. SPE-189559-MS, presented at the SPE International Conference and Exhibition on Formation Damage Control, Lafayette, Louisiana, USA, Feb. 2018 (13 pages).

International Search Report and Written Opinion issued in corresponding International Patent Application No. PCT/US2022/028057, dated Aug. 19, 2022 (12 pages).

* cited by examiner

*Primary Examiner* — John J Figueroa

(74) *Attorney, Agent, or Firm* — Osha Bergman Watanabe & Burton LLP

(57) ABSTRACT

A method for in situ acid stimulation of a subterranean formation that contains a hydrocarbon reservoir may include contacting the formation with an acidizing fluid comprising an aqueous fluid, a sulfonyl chloride, and a mutual solvent, wherein upon exposure to formation temperatures, the sulfonyl chloride and aqueous fluid hydrolyze the sulfonyl chloride, thereby producing hydrochloric acid.

18 Claims, No Drawings

RETARDED ACID SYSTEM BASED ON SULFONYL CHLORIDE AND METHODS THEREOF

BACKGROUND

In oil and gas drilling, wellbore stimulation is a common treatment performed in subterranean formations to enhance the production from oil and gas producing wells or the injectivity of water injection wells. Several ways exist to execute these stimulation treatments and their definition depends on the way the treatments are executed or the fluid used therein. When relatively small volumes of acids are used to remove the damage surrounding the wellbore, the treatment is referred to as matrix stimulation treatment. Matrix stimulation treatment generally involves pumping fluids, usually acids with other additives, to the wellbore and squeezing the fluids inside the formation to a shallow penetration depth. Normally, these fluids are pumped at pressures below the parting pressure of formation rock called "reservoir fracture pressure". These matrix stimulation treatment fluids may contain acid only in their simplest form, but normally are mixtures of sophisticated formulations of various acids, such an emulsified form.

Another method of the stimulation treatment is fracturing. Fracturing utilizes treating pressures above the reservoir fracturing pressure. Fracturing is normally classified into two main types depending on the fluid used during the closure of the fracture. If acid is used during the closure of the fracture, the treatment is referred to as an acid fracturing stimulation treatment. The enhancement of the production after this treatment depends on the etched surface on the walls of the fracture that is leftover after the exposure to the acid. If, on the other hand, sand, or proppant are used to leave the fracture open, the treatment will be called proppant fracturing treatment or more often hydraulic fracturing treatment. Other types of fracturing treatments do exist and are generally referred to as frac and pack and water fracs.

Acid fracturing is normally done for carbonaceous rock because only this type of rock can be etched upon exposure to acids. The enhancement in the permeability in the fractured well depends to a large extent on the conductivity of the resulting fracture. Most significantly, it depends on the etching degree of the surface after exposure to the acid. Also, it depends on the acid penetration length. Normally, the acid does not reach the tip of the created fracture because of its high spending on the inlet of the fracture.

It has been estimated that a significant portion of the world's oil and gas reserves lie in carbonate reservoirs. The mineralogy of these heterogeneous carbonate formations primarily consists of calcite, dolomite, or combinations thereof. Production enhancement methods routinely rely on the use of matrix stimulation technologies to dissolve calcium and magnesium-based carbonates. Several acid platforms have been proposed and are widely used by oil and gas operators to stimulate or enhance hydrocarbon production in existing carbonate reservoir rock formations. These include but are not limited to use of strong mineral acids (e.g., hydrochloric acid), gelled and emulsified acids, organic-based acids (e.g., formic acid and acetic acid), and combinations thereof.

Typically, the acid treatment enters the formation and where employed successfully creates a barrier causing the acid to release slowly at a distance from the well-bore. The reaction of the released acid with the formation rock takes place simultaneously at different places inside the formation, resulting in channels that are joined together to form continuous wormholes.

Conventional acids react very quickly in carbonate formations. The reaction is so rapid in great temperatures that it is impossible for acid to penetrate, or wormhole, more than a few inches into the formation. In such cases, the acid is rendered ineffective in stimulating the wellbore. Compositions known in the art that attempt to solve this problem, such as emulsified acids, are relatively viscous emulsions and cannot be efficiently pumped at fast rates into reservoirs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for in situ acid stimulation of a subterranean formation that contains a hydrocarbon reservoir that includes contacting the formation with an acidizing fluid comprising an aqueous fluid, a sulfonyl chloride, and a mutual solvent, wherein upon exposure to formation temperatures, the sulfonyl chloride and aqueous fluid hydrolyze the sulfonyl chloride, thereby producing hydrochloric acid.

In another aspect, embodiments disclosed herein relate to a method for in situ acid stimulation of a subterranean formation that contains a hydrocarbon reservoir that includes contacting the formation with a monophasic, sulfonyl chloride-containing acidizing fluid having a viscosity of less than 50 cP at a shear rate of 100 s$^{-1}$, where upon exposure to formation temperatures, sulfonyl chloride hydrolyzes to produce hydrochloric acid.

In yet another aspect, embodiments disclosed herein relate to an acidizing fluid that includes an aqueous fluid; a sulfonyl chloride; and a mutual solvent, wherein the aqueous fluid; sulfonyl chloride; and mutual solvent are present in at a ratio to form a single phase.

Other aspects and advantages of the claimed subject matter will be apparent from the following description and the appended claims.

DETAILED DESCRIPTION

Embodiments disclosed herein relate to a delayed acidizing fluid based on sulfonyl chloride that is monophasic. In particular, use of sulfonyl chloride-based acidizing fluids may provide a formulation which slows the acid reaction rate, to allow for deeper wellbore penetration by acidizing stimulation. Moreover, in addition to a retarded reaction rate, the acidizing fluids of the present disclosure may have rheological properties conducive to fast pumping rates and high temperature and high pressure ("HTHP") environments.

In particular, the acidizing fluids of the present disclosure may be pumped into a wellbore drilled through a carbonate formation. Wellbores are generally drilled in proximity to a target hydrocarbon formation, to allow for the production of such hydrocarbons to the surface. The formation surrounding the wellbore is porous and allows for the target oil or gas to flow from the formation to the wellbore. This flowing of target oil or gas to the wellbore enables the extraction of the target oil or gas through the wellbore. However, geologic carbonate formations, which can be tight, may be present near or around the desired oil or gas bearing formations and wellbore and can negatively impact the productivity of a wellbore. To mitigate the impact carbonate formations have on the productivity of the wellbore, the wellbores may be treated with the acidizing fluids of the present disclosure.

In one or more embodiments, methods of the present disclosure may involve adding acid into a wellbore at a pressure less than the formation's fracturing pressure to acidize the formation. Because acidizing occurs at a pressure less than the corresponding acid fracturing pressure, it is generally easier to control and direct the flow of the acid in an efficient manner. Conventional acids react with the carbonate too quickly and cannot permeate, or wormhole, into less permeable formation. Conversely, emulsified fluids (commonly used as a way to slow down the acid reaction) are viscous, presenting difficulties in pumping the fluids at high rates. In contrast, the acidizing fluids of the present disclosure advantageously provide for a monophasic (and thus less viscous) fluid containing sulfonyl chloride, which must first hydrolyze prior to releasing hydrochloric acid, which will in turn react with the carbonate formation.

During acidizing operations, the acid is generally chemically consumed and neutralized as the target formation is dissolved. For a general acid, HA (with conjugate anion, A-), reacting with a general carbonate, $MCO_3$, this reaction proceeds according to Equation 1:

$$HA(aq) + MCO_3(s) \rightarrow M(aq) + + A(aq) - + H_2O(l) + CO_2(g) \qquad \text{Eq. (1)}$$

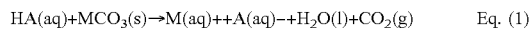

As is apparent from the chemical equation, the carbonate is dissolved into the aqueous acid solution and carbon dioxide is evolved. Further, the amount of carbon dioxide evolved is directly proportional to the amount of carbonate dissolved. This reaction generally occurs instantaneously and proceeds to completion quickly. Using the sulfonyl chloride-containing fluids of the present disclosure, this reaction shown in Equation 1 occurs at a slower rate, enabling the acidizing solution to wormhole further into the carbonate formation because fluid does not contain an acid, but hydrolyzes in situ to produce hydrochloric acid, as shown in Equation 2:

$$RSO_2Cl + H_2O \rightarrow RSO_3H + HCl \qquad \text{Eq. (2)}$$

Thus, upon introducing the sulfonyl chloride-containing fluids of the present disclosure into the formation, hydrolysis of sulfonyl chloride shown in Equation 2 occurs prior to the acidizing reaction of Equation 1, thereby enabling the acidizing solution to wormhole further into the carbonate formation before the acid is consumed.

Thus, the monophasic fluids of the present disclosure stand in contrast to conventional emulsified fluids, which have a mixture comprising immiscible phases, where one immiscible phase (discontinuous phase) is dispersed evenly throughout the other immiscible phase (continuous phase). The acid reaction rate of conventional emulsified acids is delayed due to the emulsification or dispersion of the acid into the discontinuous phase. In contrast, embodiments of the present disclosure rely on hydrolysis of the sulfonyl chloride as a first step to delay the second step of acid reaction.

In particular, sulfonyl chloride-based fluids release hydrochloric acid once hydrolyzed at high temperature. Based on the reactivity of sulfonyl chlorides with water (to hydrolyze into sulfonic acid and hydrochloric acid), the fluids of the present disclosure also incorporate a mutual solvent, to delay the hydrolysis. Thus, embodiments of the present disclosure may be formulated to be in continuous contact, given the presence of water in the fluid, will release HCl in situ when the fluid is exposed to heat inside the formations. This mechanism will provide the retardation mean for stimulation treatments in both matrix and acid fracturing treatments. Additionally, use of the mutual solvent will ensure the system is a single phase (monophasic) and that no high friction losses are associated with its application (which are common with emulsified acids).

Thus, in accordance with the present disclosure, the aqueous fluid, sulfonyl chloride, and mutual solvent are present in at a ratio sufficient to form a single phase. In one or more embodiments, the mutual solvent may be present in an amount greater than or equal to 30 vol %, the sulfonyl chloride may be present in an amount of at most 50 vol %, and the aqueous fluid is the balance (and in particular embodiments is at least 20 vol %).

Sulfonyl chloride, expressed as $RSO_2Cl$ above, may include as R any hydrocarbon group (linear, branched, or cyclic), optionally containing one or more heteroatoms, including but not limited to alkyl groups, cycloalkyl groups, alkyl ethers, aryl groups, as well as substituted derivatives thereof. Specific examples of sulfonyl chlorides may include benzenesulfonyl chloride, alkylbenzene sulfonyl chlorides (e.g., dodecylbenzene sulfonyl chloride).

The amount of sulfonyl chloride used in embodiments of the present disclosure can be varied to tune the amount of acid that will release, such as depending upon the applications in which the compositions are being used. In an aspect, the acidizing fluids has a sulfonyl chloride concentration such that upon hydrolysis, the sulfonyl chloride produces an acid concentration in a range of about 2 wt. % to about 20 wt. % HCl. This eventual acid concentration leads to a desired reaction time with carbonate formation rock, thereby allowing the acid to react on the face of the rock immediately before invading inside the formation.

In one or more embodiments, the aqueous fluid may include one or more than one of fresh water, salt water, brine, connate brine, municipal water, formation water, produced water, well water, filtered water, distilled water, and sea water. In some embodiments, the aqueous fluid may include water or a solution containing water and one or more inorganic compounds dissolved in the water or otherwise completely miscible with the water. In some embodiments, the aqueous solution may contain brine, including natural and synthetic brine. Brine includes water and a salt that may include calcium chloride, calcium bromide, sodium chloride, sodium bromide, other salts, and combinations of these. Other suitable salts include, by way of example and not limitation, lithium salts, sodium salts, potassium salts, beryllium salts, magnesium salts, calcium salts, transition metal salts, halides, oxides, sulfides, selenides, phosphides, sulfates, sulfites, phosphates, and phosphites. The aqueous fluid may include total dissolved solids of greater than 0.1 wt. % total dissolved solids, based on the total weight of the aqueous fluid.

The acidizing fluid also contains a mutual solvent therein. As used herein, a mutual solvent is defined as a solvent that as some solvency or miscibility with both water and an oleaginous fluid. In the present embodiments, the mutual solvent may ensure the release of HCl from the acid precursors. In one or more embodiments, the mutual solvent may be selected from glycol ethers (such as, but not limited to, ethylene glycol monobutyl ether, dipropylene glycol dimethyl ether, propylene glycol n-butyl ether, or diethylene glycol butyl ether), alcohols (such as, for example, aliphatic alcohols, glycols, polyglycols), and glycol esters as well as mixtures thereof.

It is also envisioned that one or more embodiments of the acidizing fluids may also include one or more types of additives such as a corrosion inhibitor, scale inhibitor, viscosity modifier, salts, clay stabilizers, etc. In particular, given the production of acid in the acidizing fluid, which may flow back into the wellbore, it is particular contemplated that at least one corrosion inhibitor is either presence in the acidizing fluid, or pumped downhole in an adjacent fluid to help counteract acid exposed to the downhole equipment. One of the difficulties encountered when acid-based stimulating methods are employed is that most of the well tubing and downhole equipment is made of metal. In traditional acid-based stimulating methods utilized in oil wells, particularly as temperatures and pressures increase, the injected acids are corrosive to the metal tubing and in the downhole equipment. To help prevent this, corrosion inhibitors may be added to the acids. The corrosion inhibitors act to coat the metal and minimize the corrosive effect of the acids. As temperatures and pressures increase, acid reactivity also increases and increased amounts of inhibitor are needed to compensate for the increased reactivity. Example corrosion inhibitors include, but are not limited to, amines, ammonia, quaternary ammonium salts, morpholine, oxygen scavengers, and thiourea.

Further, given the discussion of the present acidizing fluid being a monophasic fluid, it is envisioned that the acidizing fluids of the present disclosure may be substantially free of emulsifier. For example, the acidizing fluid may contain less than an amount that would otherwise form a dispersion of one fluid phase within another fluid phase, such as less than 2 wt % of an emulsifier or less than 1 wt % of an emulsifier.

The methods and compositions of the present disclosure can be used in various types of formations, but may particularly effective in carbonate formations. Other types of formations in which the methods and compositions of the present invention can be used will be apparent to those of skill in the art and are to be considered within the scope of the present disclosure.

The methods and compositions of the present disclosure can be used in formations having a variety of operational conditions. For example, the methods and compositions of the present disclosure can be used in a variety of temperatures. In an aspect, the step of contacting the formation with the acidizing fluid occurs in a temperature range up to about 300° F. (149° C.). Besides a wide temperature range, the contact time in which the compositions are used can also be varied. For example, the step of contacting the formation with the acidizing treatment fluid can occur in a contact time that ranges from about one hour to several hours; or alternatively, from about one hour to about eight hours. Other process conditions that can be varied will be apparent to those of skill in the art and are to be considered within the scope of the present disclosure.

In order to achieve maximum benefit, the injected acid should reach the entire target zone, which is often difficult to achieve because of a natural tendency of the acid to react with the first reactive formation rock with it contacts, whether it is closest to the wellbore, or at its most porous portion, in matrix stimulations. Thus, it is understood that the present methods and compositions may be used in combination with one or more diverting treatments. That is, attempts to achieve complete contact of acid with an entire rock formation zone, which is referred to as zonal coverage, may optionally involve diversion of the acidizing fluid from the region first contacted (high permeability) to new less permeable regions (more damaged) regions by use of a viscous diversion agent.

Further, it is also envisioned that the acidizing fluids of the present disclosure may be used in a multistage process which includes alternating stages. For, an acidizing fluid of the present disclosure may be injected, followed injecting an optional a spacer, which typically includes certain additives, such as a corrosion inhibitor, an iron control agent, a water wetting surfactant and an $H_2S$ scavenger, as needed. It is also envisioned that a diversion agent may be used in such alternating injections. Further, multistage injections may also include a preflush, main fluid and postflush, depending on the geometry of the well, the history of its operations with corresponding damage cause and the lithology of its rock.

In one or more embodiments, the acidizing solution may be need to kept at temperature and pressure conditions different than those near the carbonate formation to prevent or reduce premature hydrolysis. In such embodiments, the acidizing fluid may be passed through an insulator prior to being introduced to the carbonate formation. As used in the present context, an insulator refers to a tubular that separates a fluid on the inside of the tubular from the environment outside of the tubular. In one or more embodiments, the acidizing fluid is pumped through and insulator that runs from the surface to the carbonate formation. The insulator may be made out of materials inert to reaction with the sulfonyl chlorides. In one or more embodiments, the insulator is made out of metal, plastic, or other composite materials. Pressure or a vacuum may be applied to the interior of the insulator to adjust the pressure conditions in the insulator as needed. Additionally, the insulator may be heated or cooled to adjust the temperature of the interior of the insulator as needed. As described previously, the formation permeability may affect the rate and pressure at which the acidizing fluid is pumped.

In addition to formation permeability, other factors may contribute to the requisite pumping pressure and rate required to acidize a carbonate formation. For example, HTHP conditions in the wellbore may affect the pumping rate or pressure required to introduce the acidizing solution to a subterranean carbonate formation. In HTHP environments temperatures can range from 150° C. to 320° C. and static reservoir pressures can range from 10,000 pounds per square inch (psi) to 20,000 psi.

As mentioned above, one or more embodiments relate to the use of the acidizing fluid in acid fracturing. In such embodiments, in the injection phase, the acidizing fluid is injected into the formation rock. After injection, the acidizing fluid may hydrolyze (releasing hydrochloric acid) and enter the formation rock to part or open fractures in the formation and to etch pathways in the formation rock. It is also envisioned that during acid fracturing, a gelled water or crosslinked gel fluid may be used as a pad fluid to fill the wellbore and break down the formation. The water-based pad is then pumped to create the desired fracture height, width, and length for the hydraulic fracture. Once the desired values of created fracture dimensions are achieved, the acidizing fluid is pumped and fingers down the fracture to etch the walls of the fracture to create fracture conductivity.

EXAMPLES

As shown in Table 1, monophasic sulfonyl chloride fluids were formulated with water, and EGMBE as a mutual solvent to show the range of fluid components present, resulting in a clear (monophasic) fluid, and the amount of HCl produced.

TABLE 1

| Mutual Solvent vol % | Water vol % | Benzenesulfonyl Chloride vol % | Appearance | HCl wt % |
|---|---|---|---|---|
| 60 | 6.6 | 33.33 | Clear | 8.5 |
| 60 | 6.6 | 33.33 | | 9.0 |
| 50 | 33.3 | 16.6 | | 4.0 |
| 60 | 6.6 | 33.3 | | 7.0 |
| 50 | 7.1 | 42.8 | | 7.0 |
| 50 | 6.6 | 43.3 | | 8.7 |
| 50 | 7.1 | 42.8 | | 9.9 |
| 60 | 13.3 | 26.6 | | 7.4 |
| 60 | 20 | 20 | | 6.5 |
| 50 | 7 | 43 | | 11.0 |
| 50 | 5 | 45 | | 10.3 |

Table 2 shows several ratios of the components, illustrating that without sufficient mutual solvent, a monophasic fluid does not result.

TABLE 2

| Mutual Solvent vol % | Water vol % | Benzenesulfonyl Chloride vol % | Appearance |
|---|---|---|---|
| 50 | 33.3 | 16.6 | Clear. |
| 33.3 | 44.4 | 22.2 | |
| 33.3 | 22.2 | 44.4 | |
| 20 | 53.3 | 26.6 | Not Clear |
| 20 | 26.6 | 53.3 | |

A sulfonyl chloride-based acidizing fluid containing 50 vol % EGMBE, 7 vol % water, and 43 vol % benzenesulfonyl chloride was compared with that of typical 70/30 emulsified acid (containing 15 wt % acid). Table 3 below shows that the sulfonyl chloride-based acidizing fluid has much lower viscosity an emulsified acid.

| System | Shear rate, $S^{-1}$ | Viscosity, cP |
|---|---|---|
| Emulsified Acid | 100 | 75 |
| Sulfonyl Chloride (RSO2-Cl)-based fluid | 100 | 10 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. An acidizing fluid, comprising:
   an aqueous fluid;
   a sulfonyl chloride; and
   a mutual solvent,
   wherein the aqueous fluid; sulfonyl chloride; and mutual solvent are present at a ratio to form a single miscible phase.

2. The acidizing fluid of claim 1, wherein the acidizing fluid has a viscosity of less than 50 cP at a shear rate of 100 s-1.

3. The acidizing fluid of claim 1, wherein the acidizing fluid has a viscosity of less than 20 cP at a shear rate of 100 s-1.

4. The acidizing fluid of claim 1, wherein the mutual solvent is present in an amount greater than or equal to 30 vol %, the sulfonyl chloride is present in an amount of at most 50 vol %, and the aqueous fluid is the balance.

5. The acidizing fluid of claim 1, wherein the sulfonyl chloride is a benzene sulfonyl chloride.

6. The acidizing fluid of claim 1, wherein the mutual solvent is selected from an alcohol, glycol ether, and glycol ester.

7. A method for in situ acid stimulation of a subterranean formation that contains a hydrocarbon reservoir, the method comprising:
   contacting the formation with an acidizing fluid comprising an aqueous fluid, a sulfonyl chloride, and a mutual solvent,
   wherein upon exposure to formation temperatures, the sulfonyl chloride and aqueous fluid hydrolyze the sulfonyl chloride, thereby producing hydrochloric acid, and
   wherein the aqueous fluid, sulfonyl chloride, and mutual solvent are present at a ratio to form a single miscible phase.

8. The method of claim 7, wherein the mutual solvent is present in an amount greater than or equal to 30 vol %, the sulfonyl chloride is present in an amount of at most 50 vol %, and the aqueous fluid is the balance.

9. The method of claim 7, wherein the acidizing fluid has a viscosity of less than 50 cP at a shear rate of 100 $s^{-1}$ and a temperature of 25° C.

10. The method of claim 7, wherein the acidizing fluid has a viscosity of less than 20 cP at a shear rate of 100 $s^{-1}$ and a temperature of 25° C.

11. The method of claim 7, wherein the sulfonyl chloride is a benzene sulfonyl chloride.

12. The method of claim 7, wherein the mutual solvent is selected from an alcohol, glycol ether, and glycol ester.

13. The method of claim 7, wherein upon hydrolysis, the sulfonyl chloride produces an acid concentration in a range of about 2 wt. % to about 15 wt. %.

14. A method for in situ acid stimulation of a subterranean formation that contains a hydrocarbon reservoir, the method comprising:
   contacting the formation with a monophasic, sulfonyl chloride-containing acidizing fluid having a viscosity of less than 50 cP at a shear rate of 100 sl, where upon exposure to formation temperatures, sulfonyl chloride hydrolyzes to produce hydrochloric acid, and
   wherein the monophasic, sulfonyl chloride-containing acidizing fluid comprises an aqueous fluid, the sulfonyl chloride, and a mutual solvent, are present at a ratio to form a single miscible phase.

15. The method of claim 14, wherein the mutual solvent is present in an amount greater than or equal to 30 vol %, the sulfonyl chloride is present in an amount of at most 50 vol %, and the aqueous fluid is the balance.

16. The method of claim 14, wherein the sulfonyl chloride is a benzene sulfonyl chloride.

17. The method of claim 14, wherein the mutual solvent is selected from an alcohol, glycol ether, and glycol ester.

18. The method of claim 14, wherein upon hydrolysis, the sulfonyl chloride produces an acid concentration in a range of about 2 wt. % to about 15 wt. %.

* * * * *